US012704242B1

(12) United States Patent
Roper et al.

(10) Patent No.: US 12,704,242 B1
(45) Date of Patent: Aug. 11, 2026

(54) BULB-HOLDING GUTTER CLIP

(71) Applicants: Loren A. Roper, Omaha, NE (US); Dean Stiteler, Camp Hill, PA (US)

(72) Inventors: Loren A. Roper, Omaha, NE (US); Dean Stiteler, Camp Hill, PA (US)

( * ) Notice: Subject to any disclaimer, the term of this patent is extended or adjusted under 35 U.S.C. 154(b) by 0 days.

(21) Appl. No.: 18/141,578

(22) Filed: May 1, 2023

Related U.S. Application Data

(63) Continuation of application No. 17/952,220, filed on Sep. 24, 2022, now Pat. No. 11,674,672.

(60) Provisional application No. 63/248,159, filed on Sep. 24, 2021.

(51) Int. Cl.
*F21V 21/088* (2006.01)

(52) U.S. Cl.
CPC .................................. *F21V 21/088* (2013.01)

(58) Field of Classification Search
CPC . F21V 21/088; F21V 21/0885; A47G 33/105; Y10T 24/4465; F16B 2/20; F16B 2/22; F21W 2121/004
USPC .................... 248/617, 229.16, 229.26, 316.7
See application file for complete search history.

(56) References Cited

U.S. PATENT DOCUMENTS 1,895,656 A 1/1933 Gadke
2,703,359 A 3/1955 Miller
3,599,918 A 8/1971 Pratchett
3,883,926 A * 5/1975 Reynolds .............. F21V 21/088 24/339
D365,014 S 12/1995 Fennesy et al.
D376,535 S 12/1996 Gary et al.
5,581,956 A 12/1996 Fennessy et al.
5,607,230 A 3/1997 Protz, Jr.
5,609,415 A * 3/1997 Protz, Jr. ................ F21V 21/08 362/396
D385,776 S * 11/1997 Protz, Jr. ........................ D8/395
5,772,166 A 6/1998 Adams
D414,291 S * 9/1999 Gary .............................. D8/395
6,068,229 A 5/2000 Wang et al.
D427,510 S * 7/2000 Gary .............................. D8/367
D429,023 S * 8/2000 Hughes ........................ D26/138
D432,905 S * 10/2000 Sutker ............................ D8/394
6,604,837 B2 8/2003 Sandberg
D510,018 S * 9/2005 Tognolini ....................... D8/395
D530,598 S 10/2006 Jackson et al.
D531,018 S 10/2006 Jackson et al.
D562,675 S 2/2008 Cox et al.
D675,510 S * 2/2013 Gary .............................. D8/395
D696,105 S 12/2013 Devilliers et al.
8,888,337 B2 11/2014 Adams, IV et al.
D798,139 S * 9/2017 Giannatti ....................... D8/394

(Continued)

OTHER PUBLICATIONS

Photograph of Model C9GC Gutter Clip, Brite Ideas Decorating, Inc., Omaha, Nebraska first sold in 2014.

*Primary Examiner* — Ingrid M Weinhold
(74) *Attorney, Agent, or Firm* — Hooker & Habib, P.C.

(57) ABSTRACT

A clip for holding a light bulb for display on a gutter, shingle, or other structure includes a base, a support arm extending from an end of the base to a second end of the support arm, and a cantilever beam extending from the second end of the support arm towards the base. The cantilever beam and base define a clip mouth for receiving the structure into the clip. A bulb holder is rigidly attached to the support arm and defined a through-hole to receive the light bulb held by the clip. The bulb holder is attached to the support arm between the cantilever beam and base.

17 Claims, 4 Drawing Sheets

(56) References Cited

U.S. PATENT DOCUMENTS

| | | | | |
|---|---|---|---|---|
| 10,180,242 | B2 | 1/2019 | Schreiber et al. | |
| 10,281,084 | B2 | 5/2019 | Felt | |
| D856,791 | S * | 8/2019 | Limber | D8/395 |
| 10,539,267 | B2 * | 1/2020 | Olsen | F16M 13/022 |
| D874,914 | S | 2/2020 | Felt | |
| 10,557,620 | B2 | 2/2020 | Felt | |
| 10,711,985 | B2 | 7/2020 | Felt | |
| 11,353,199 | B2 | 6/2022 | Felt | |
| D968,209 | S * | 11/2022 | Xu | D8/395 |
| 11,674,672 | B1 * | 6/2023 | Roper | F16B 2/20<br>362/396 |
| D1,009,607 | S * | 1/2024 | Limber | D8/356 |
| 11,913,626 | B2 | 2/2024 | Felt | |
| 11,971,156 | B1 * | 4/2024 | Ketterling | F21V 21/088 |
| D1,040,393 | S * | 8/2024 | Song | D8/395 |
| 2002/0186562 | A1 * | 12/2002 | Schroetter | F21V 21/088<br>362/396 |
| 2006/0152927 | A1 | 7/2006 | Vendrick | |
| 2018/0187867 | A1 * | 7/2018 | Adams, IV | F21V 17/16 |
| 2018/0245733 | A1 * | 8/2018 | Felt | F21V 21/088 |
| 2019/0257502 | A1 * | 8/2019 | Felt | F21V 21/088 |
| 2020/0049331 | A1 * | 2/2020 | Felt | F21V 21/088 |
| 2021/0033267 | A1 * | 2/2021 | Felt | F21V 21/0885 |
| 2021/0102687 | A1 * | 4/2021 | Brettmann-Skogg | F21S 4/10 |
| 2022/0010946 | A1 * | 1/2022 | Chen | F21V 17/164 |
| 2023/0095202 | A1 * | 3/2023 | Felt | F21V 21/0885<br>362/396 |
| 2024/0133545 | A1 * | 4/2024 | Limber | F16B 2/22 |
| 2024/0247786 | A1 | 7/2024 | Felt | |

* cited by examiner

BULB-HOLDING GUTTER CLIP

RELATED APPLICATION

This application is a continuation of and claims priority to and the benefit of the filing date of U.S. patent application Ser. No. 17/952,220 "Bulb-Holding Gutter Clip" filed Sep. 24, 2022 and pending on the filing date of this patent application, which in turn claimed priority to and the benefit of the filing date of U.S. Provisional Patent Application Ser. No. 63/248,159 "Clip" filed Sep. 24, 2021.

FIELD OF THE DISCLOSURE

The disclosure relates to the field of supporting ornamentation for display, and in particular, to supporting light bulbs for display on gutters, shingles, or other outdoor structures.

BACKGROUND OF THE DISCLOSURE

Both Felt, U.S. Pat. No. 10,711,985 and Fennessy et al. U.S. Pat. No. 5,581,956, each incorporated by reference as if fully set forth herein, disclose gutter clips used to hang or mount objects such as C9 or C7 Christmas light bulbs on gutters, shingles, or other structures for outdoor display.

Both patents disclose a clip including a base body, a bracket or support arm extending upwardly away from the base, and a cantilever beam mounted on a free end of the arm and extending away from one end of the arm. The cantilever beam is spaced away from the base and faces the base. The base and cantilever beam define a gap that receives the gutter, shingle, or other structure between them and cooperatively generate an interference fit generating a spring force that assists in securing the clip to the object received in the gap.

The cantilever beam extends beyond the other side of the support arm to a bulb holder spaced away from the support arm. The bulb holder receives and secures a light bulb in a hole formed in the bulb holder. The Felt clip further includes a neck situated between and connecting the cantilever beam and the bulb holder.

Although the Felt and Fennessy clips both perform well, there is always room for improvement.

SUMMARY OF THE DISCLOSURE

Disclosed is a clip for mounting light bulbs on gutters, shingles, or other structures.

A clip in accordance with this disclosure includes an elongated base and a support arm rigidly connected to an end of the base. The support arm extends away from the base to an end of the support arm. A cantilever beam is rigidly attached to the end of the support arm and extends away from the support arm towards the base to a free end of the cantilever beam. The base and the free end of the cantilever beam define a gap between them that can receive an object into the clip, the cantilever beam being elastically deformable to generate a force retaining the object in the clip.

The clip includes a bulb holder defining a through-opening to receive and hold a light bulb. The bulb holder is rigidly attached to the support arm between and spaced away from the base and the cantilever beam.

Attaching the bulb holder directly to the support arm enables the bulb holder to be attached directly to the support arm without a neck and without the bulb holder being spaced away from the support arm. Attaching the bulb holder directly to the support arm and eliminating the neck results in better rigidity of the bulb holder with respect to the support arm, better maintains a bulb held in the bulb holder in proper alignment with the support arm 14, and reduces play or wiggle of the light bulb held by the clip with respect to the clip.

The bulb holder in possible embodiments is a

Other objects, features, and advantages of the disclosed clip will become apparent as the description proceeds, especially when taken in conjunction with the accompanying drawing sheets illustrating one or more illustrative embodiments.

DETAILED DISCLOSURE

Figure 1:
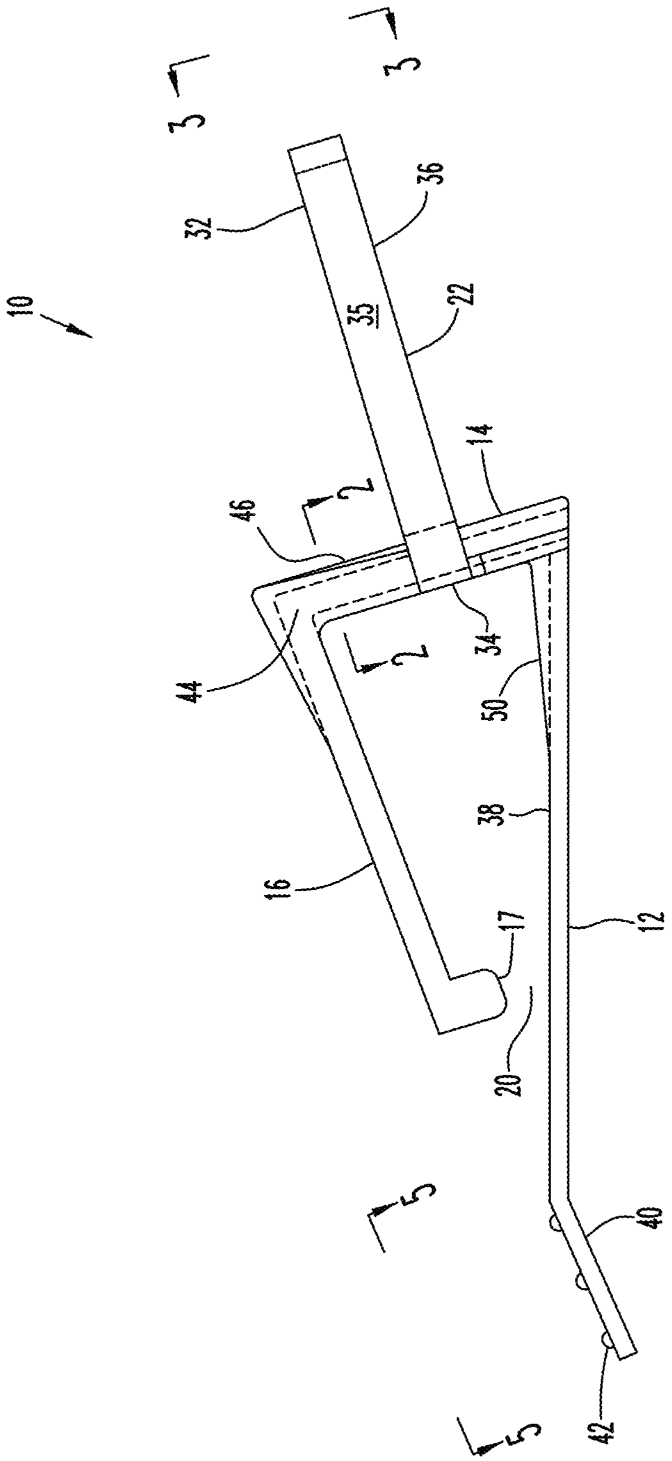
FIG. 1 is a side view of a clip in accordance with this disclosure.

FIGS. 1-5 illustrate a first embodiment of a gutter clip 10 in accordance with this disclosure.

The clip 10 is a one-piece molded plastic member formed from a resin. The resin may be acrylic, polycarbonate, polamide or nylon, polypropylene, polyethylene, or mixtures thereof capable of forming a clip 10 suitable for the environment of use.

The clip 10 includes an elongate body or base 12 having a first end and a second end. The base 12 initially extends from the base first end along a linear axis. A strut or support arm 14 has spaced apart first and second ends that collectively define an axis of the support arm 14. The first end of the support arm 14 is rigidly connected to the second end of the base 12. The support arm 14 is rigidly connected to the second end of the base 12 and extends upwardly from an upper side of the base 12 to a second end of the support arm 14 spaced away from the base 12. A cantilever or cantilever beam 16 has a first end rigidly connected to the second end of the support arm 14. The cantilever beam 16 extends from the second end of the support arm 14 away from the support arm 14 and over the base 12 to a second, thickened end 17 of the cantilever beam 16.

Figure 2:
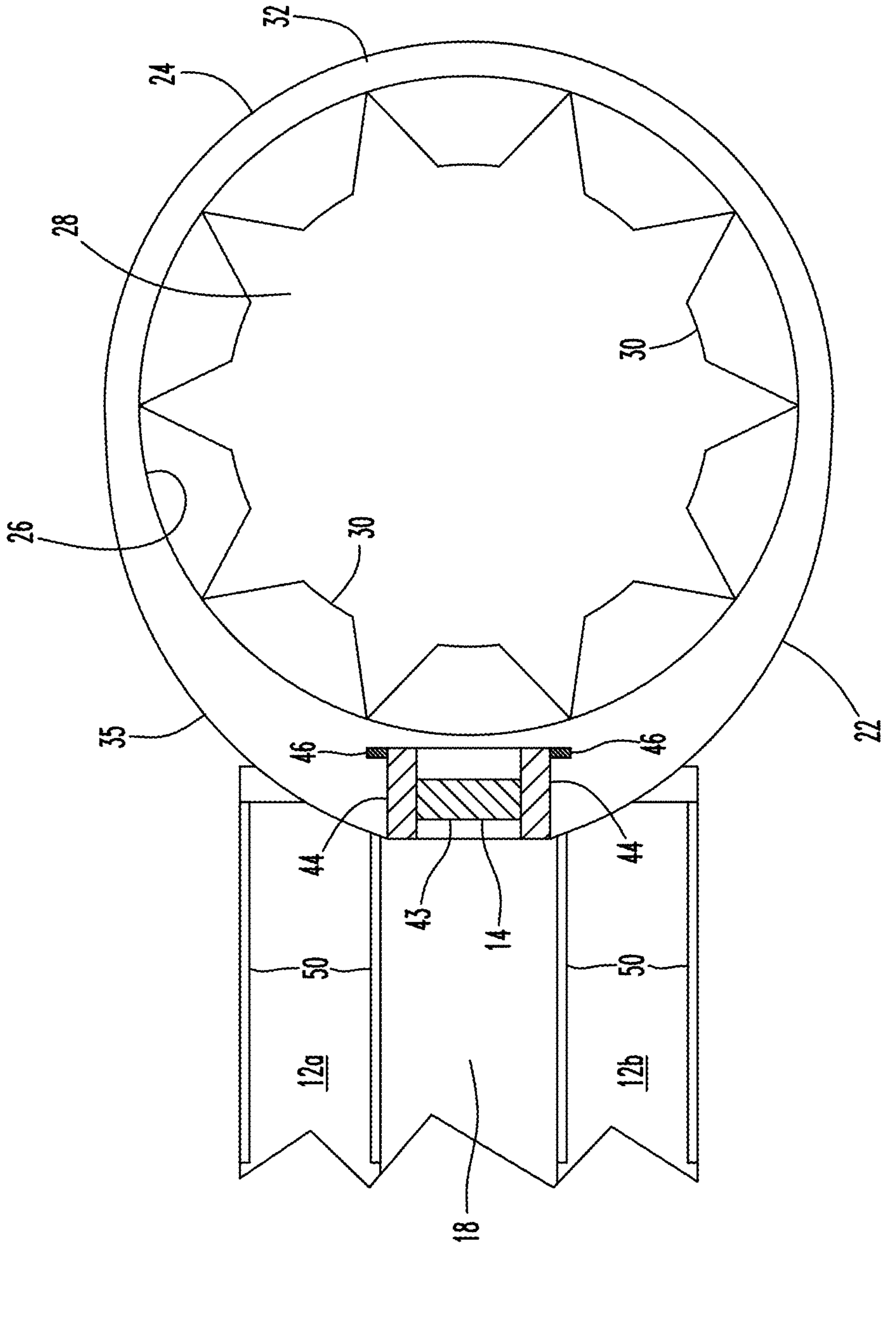
FIG. 2 is a sectional view of the clip shown in FIG. 1 taken along lines 2-2 of FIG. 1.
Figure 5:
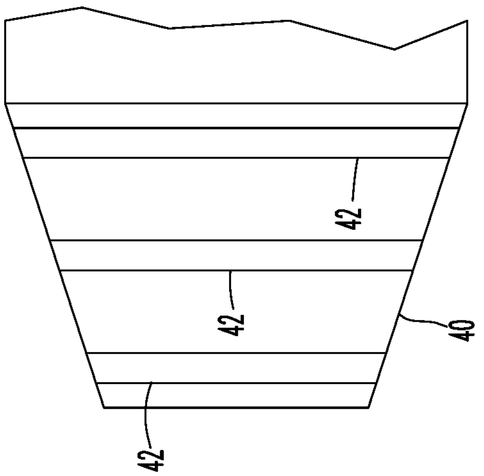
FIG. 5 is a view of the clip shown in FIG. 1 taken along lines 5-5 of FIG. 1.

The illustrated base 12 has through-cutouts 18 (see FIG. 2) to save material costs. A cutout 18 can divide the base 12 into base portions 12*a*, 12*b* extending along the cutout as illustrated in FIG. 2.

The axis of the support arm 14 and the base axis of the base 12 cooperate to define an included acute angle as shown in FIG. 1. The cantilever beam 16 is transverse to the support arm 14 and extends towards the base 12 as it extends away from the support arm 14. The cantilever beam 16 extends from the support arm 14 to the free second end spaced near the base. The thickened second end 17 of the cantilever beam 16 and the base 12 cooperatively define a gap or clip mouth 20 (exaggerated in FIG. 1 for clarity) therebetween that receives an object (not shown) such as a gutter, shingle, or the like that carries the clip 10

The clip mouth 20 is expandable by elastic deformation of the cantilever beam 16 away from the base to enable the clip 10 to receive different-sized objects into the clip. The clip 10 returns can return to its undeformed state shown in FIG. 1 when the object is removed from the clip.

The clip 10 further includes a bulb holder 22 rigidly attached to the support arm 14 at an intermediate portion of the support arm 14 spaced from both ends of the support arm 14. The bulb holder 22 is also spaced away both the base 12 and the cantilever beam 16.

The cantilever beam 16 extends along an axis and the bulb holder 22 is not disposed on the axis of the cantilever beam 16. The bulb holder 22 extends from the support arm 14 in a direction generally opposite to the direction that the cantilever beam 16 extends from the support arm 14 when the clip 10 is viewed as shown in FIG. 1.

The bulb holder 22 is formed as an unbroken tubular member or generally ring-shaped member having a generally circular or somewhat oval arcuate outer wall 24 and a generally circular inner wall 26 that completely surrounds and defines a bulb receiving through-hole 28 of the tubular member. The through-hole 28 extends along a central axis generally parallel with the axis of the support arm.

The illustrated bulb holder 22 is sized and configured to receive and hold a standard C9 Christmas light bulb. The bulb holder of other embodiments of the disclosed gutter clip may be sized to receive and hold a smaller Christmas bulb (as a non-limiting example, a C7 Christmas bulb), a larger Christmas light bulb, or a non-Christmas light bulb.

The bulb holder 22 further includes a number of circumferentially-spaced thin tabs 30 extend radially from the inner wall 26 into the through-hole 28 and are flush with the upper side 32 of the bulb holder 22. The tabs 30 assist in gripping a light bulb inserted into the through-hole 28. In addition to gripping the light bulb, the tabs 30 enable moisture from rain, dew, condensation, and the like to run off between a light bulb held by the bulb holder 22 and the inner wall 26 and drain away from the clip 10.

The support arm 14 and the bulb holder 22 have a portion 34 in common that includes the entire portion of the support arm between the upper side 32 and the lower side 36 of the bulb holder. This enables the bulb holder 22 to attach to the support arm without a neck and without the bulb holder 22 being spaced away from the support arm 14. Eliminating a neck extending from or spaced from the support arm 14 provides for better rigidity of the bulb holder 22 with respect to the support arm 14, maintains a bulb held in the bulb holder 22 in proper alignment with the support arm and 14, reduces play or wiggle allowed by conventional clips.

The bulb holder outer wall 24 has a convex outer surface 35 extending from a first side of the common portion 34 of the bulb holder 22 and the support arm 14, the convex outer surface extending around the bulb holder through-hole 28 to an opposite second side of the common portion.

The base 12 includes a generally flat base portion 38 extending along the base axis from the support arm 14 and a bent or inclined tail portion 40 that extends away from the cantilever beam 16 to a free end of the base. The upper side of the tail portion 40 facing the cantilever beam 16 has a number of spaced-apart, transverse rounded protrusions or ribs 42 (the diameter of the protrusions are exaggerated in FIG. 1 for clarity). An object inserted into the clip mouth 20 can urge the base 12 to flatten against another surface, applying a force to the tail portion 40 that in reaction can increase the spring force generated by the clip 10 and better secure the clip 10 to the object. The protrusions 42 help resist an object being held between the base 12 and cantilever beam 16 from sliding out of the clip.

The clip 10 has further features to strengthen the clip and help the clip last longer when exposed to colder temperatures.

The support arm 14 has a generally "H"-shaped cross section as the support arm 14 extends away from opposite sides of the bulb holder 22.

The upper portion of the support arm 14 extending from the bulb holder 22 to the second end of the support arm 14 has an upper center wall 43 and a pair of upper support walls 44 disposed on opposite lateral sides of the center wall 43. The upper support walls 44 extend from the bulb holder to beyond the cantilever beam 16 before extending over and tapering into the cantilever beam 16. Extending from the upper support walls 44 are gussets formed as triangular upper side walls 46 rigidly connected to the bulb holder 22. The upper side walls 46 extend from the upper side 32 of the bulb holder and narrow as they extend upwardly along the upper support walls 44.

The lower portion of the support arm 14 extending from the bulb holder 22 to the first end of the support arm 14 has a wider lower center wall 43 that more widely space apart the thicker lower support walls 44. Extending from the lower support walls 44 are gussets formed as generally rectangular lower side walls 46 rigidly connected to the lower side 36 of the bulb holder 22. The lower side walls 46 define shoulders 48 adjacent the bulb holder 22 that cooperate with the lower support walls 44 to provide strong support of the bulb holder.

The support walls 44 and side walls 46 strengthen the clip 10 and enable the clip 10 to last longer as compared to conventional clips when exposed to colder temperatures.

Gussets formed as side walls 50 (see FIGS. 1 and 2) are rigidly connected to the base 12 and the support arm 14. The side walls 50 are formed as generally triangular walls located on the upper side of the base 12 that extend from the support arm 14along the base 12. A first pair of the side walls 50 extend along and adjacent to the through-cutout 18 that is closest to the support arm 14. A second pair of the side walls 50 parallel the first pair and extend along the outer sides of the base 12. The side walls 50 provide additional support of the support arm 14.

Figure 6:
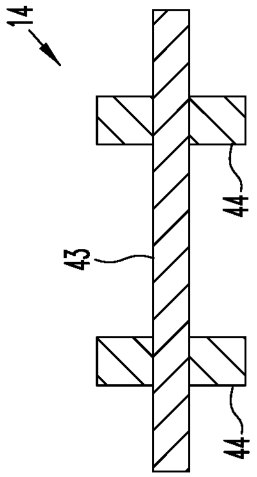
FIG. 6 is a view similar to FIG. 5 of a second embodiment clip in accordance with this disclosure.
Figure 7:
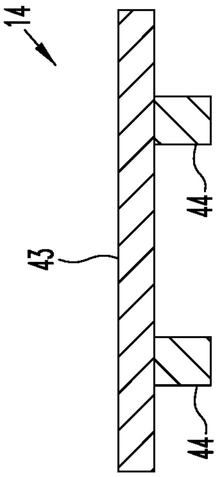
FIG. 7 is a view similar to FIG. 5 of a third embodiment clip in accordance with this disclosure.
Figure 3:
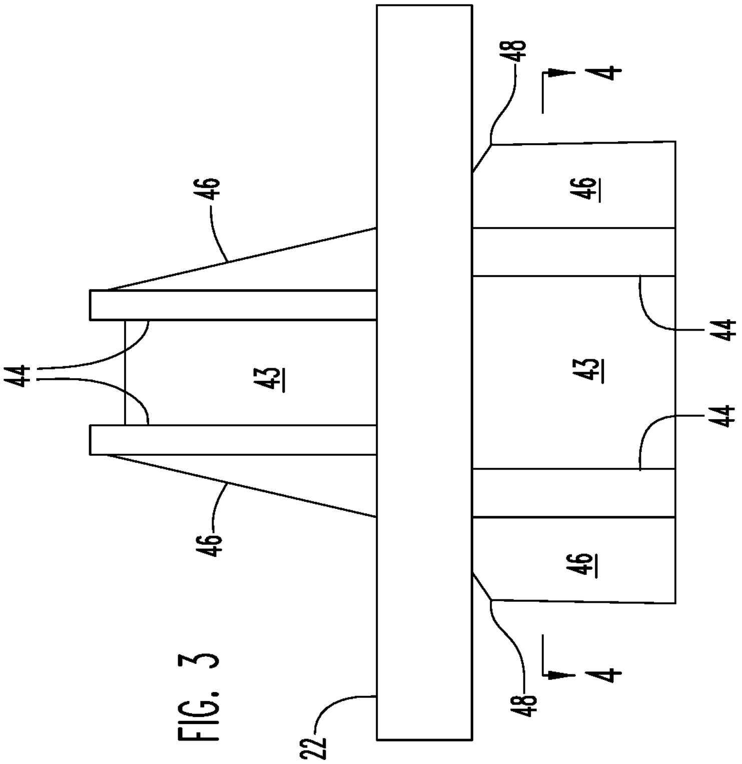
FIG. 3 is a view of the clip shown in FIG. 1 taken along lines 3-3 of FIG. 1.
Figure 4:
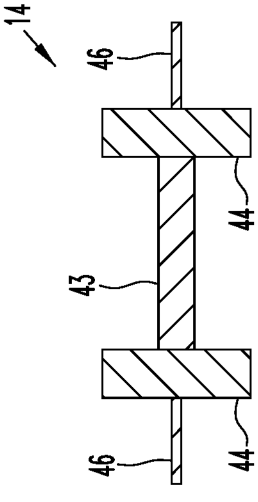
FIG. 4 is a sectional view of the clip shown in FIG. 1 taken along lines 4-4 of FIG. 3.

FIGS. 6 and 7 illustrate a second embodiment and a third embodiment respectively of a clip in accordance with this disclosure. The second and third clip embodiments are otherwise identical to the clip 10 but in each of the second and third embodiment clip the lower portion of the support arm 14 is modified. In the second embodiment clip, the center wall 43 extends the full width of the support arm 14 and extends beyond the support walls 44. In the third embodiment clip, the center wall 43 extends the full width of the support arm 14 and extends beyond the support walls 44. The support walls 44 are located only on one side of the center wall 43. The second and third embodiments of the clip 10 use more material than the clip 10 and are intended to be used in more extreme environments or for holding larger bulbs.

Figure 8:
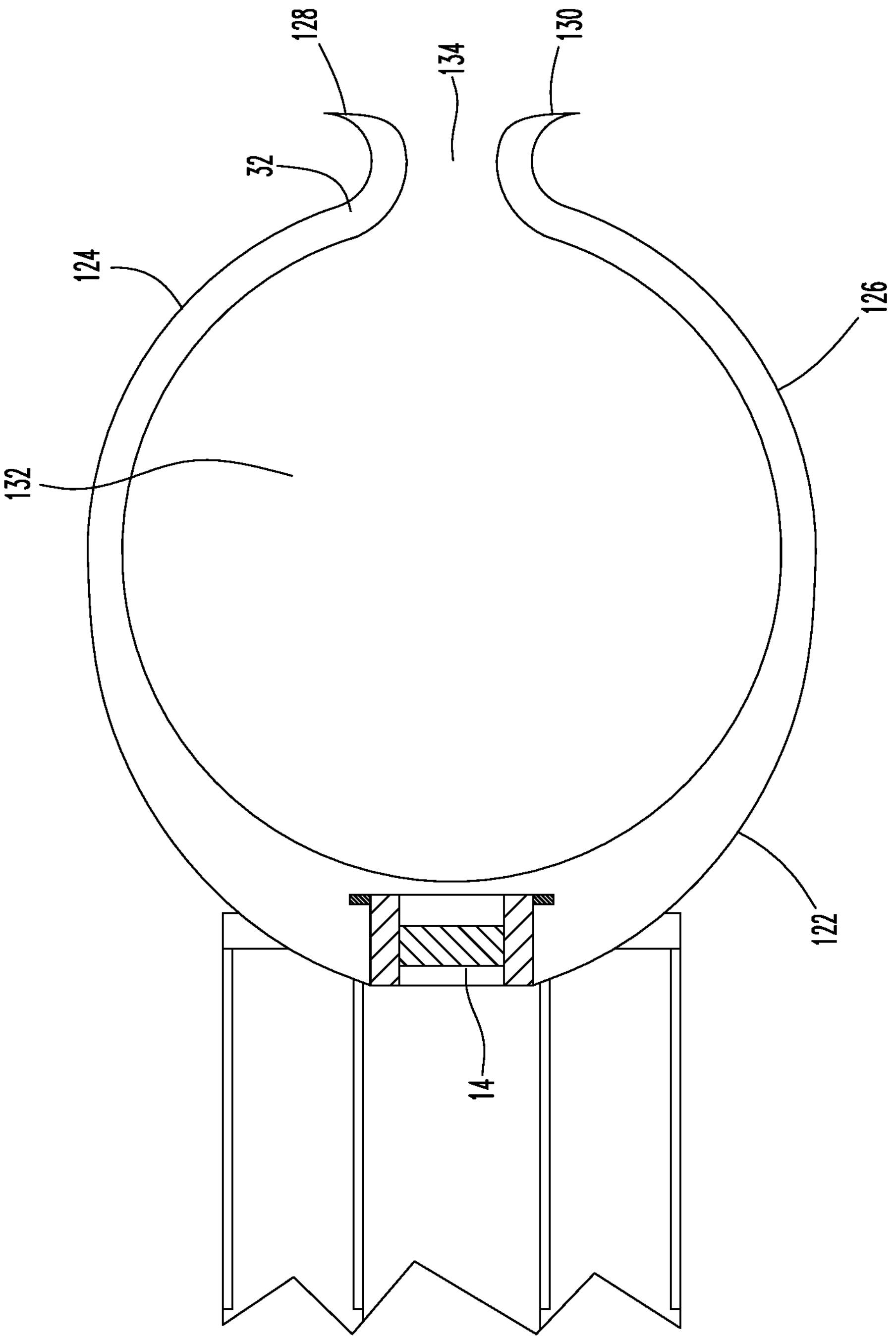
FIG. 8 is a view similar to FIG. 4 of a fourth embodiment clip in accordance with this disclosure.

FIG. 8 illustrates a portion of a fourth embodiment clip in accordance with this disclosure. The fourth embodiment clip is otherwise identical to the clip 10 but the molded bulb holder 122 is similar to a bulb holder disclosed in Adams, U.S. Pat. No. 5,772,166 incorporated by reference as if fully set forth herein. The bulb holder 112 is formed as a U-shaped bulb holder having a pair of opposed resilient arms 124, 126 extending away from the support arm 14 to respect outwardly curved, normally spaced-apart free ends 128, 130. The arms 124, 126 define a through-hole 132 of the bulb holder 122 that receives a bulb into the bulb holder via the gap 134 defined by the free ends 128, 130. The resilient arms 124, 126 deflect outwardly and function as spring arms holding the bulb in the bulb holder. The bulb holder 122 enables removing the bulb from the clip without removing the clip from where the clip is mounted.

In other possible embodiments of the fourth embodiment clip, the free ends 128, 130 normally touch each other, closing the gap 134. Other bulb holder designs are known in the clip art and can be adapted for use with the disclosed clip.

While this disclosure includes one or more illustrative embodiments described in detail, it is understood that the one or more embodiments are each capable of modification and that the scope of this disclosure is not limited to the precise details set forth herein but include such modifications that would be obvious to a person of ordinary skill in the relevant art including (but not limited to) changes in material selection, size, operating ranges (for example, maximum and minimum gap size), environment of use, and the like.

What is claimed is:

1. A clip for holding a light bulb for display on a gutter, shingle, or other structure, the clip comprising:

an elongated base having a first end and a second end;

a support arm extending along a first longitudinal axis and having a first end and an axially opposite second end spaced away from the first end of the support arm, the first end of the support arm being rigidly connected to the second end of the base, a front of the support arm facing away from the elongated base, and a rear of the support arm facing towards the elongated base;

a cantilever beam having a first end and a second end, the first end of the cantilever beam being rigidly connected to the support arm, the cantilever beam extending away from the support arm to the second end of the cantilever beam, the second end of the cantilever beam being disposed over the base, the second end of the cantilever beam and the base cooperatively defining a gap therebetween that enables receiving an object thickness into the gap, the cantilever beam being elastically deformable to accommodate objects of different thicknesses being received into the gap; and a bulb holder being rigidly attached to the support arm, the bulb holder being an unbroken tubular member extending from an upper side of the bulb holder to an opposite lower side of the bulb holder, the bulb holder defining a through-hole extending along a second axis from the upper side to the lower side of the bulb holder, the through-hole being configured to receive and hold a portion of a light bulb in the bulb holder, wherein the support arm and the bulb holder share a common portion attaching the bulb holder to the support arm; and the bulb holder outer wall comprising a convex outer surface extending from the rear of the support arm at a first side of the common portion to the rear of the support arm at an opposite second side of the common portion, such that the common portion simultaneously forms a portion of both the bulb holder and the support arm.

2. The clip of claim 1 wherein the bulb holder comprises a generally circular inner wall that completely surrounds the through-hole.

3. The clip of claim 1 wherein the bulb holder comprises a generally circular wall surrounding the through-hole of the bulb holder and the bulb holder further comprises a plurality of tabs circumferentially spaced along the wall and extending radially from the wall into the through-hole.

4. The clip of claim 3 wherein the tabs are flush with the upper side of the bulb holder.

5. The clip of claim 1 wherein the bulb holder is disposed along the support arm substantially centered between the first end of the support arm and the second end of the support arm.

6. The clip of claim 1 comprising at least one gusset rigidly attached to the bulb holder and to the support arm.

7. The clip of claim 1 comprising at least one gusset rigidly attached to the base and to the support arm.

8. The clip of claim 1 formed as a one-piece homogeneous member.

9. The clip of claim 8 formed as an injection-molded member.

10. The clip of claim 8 formed from a resin material.

11. The clip of claim 1 formed from a resin or mixture of resins.

12. The clip of claim 1 wherein the base comprises a generally flat base portion extending from the second end of the base away from the support arm and a generally flat tail portion extending from the base portion to the first end of the base, the tail portion extending away from the cantilever beam as the tail portion extends towards the first end of the base.

13. The clip of claim 12 wherein the base comprises an upper side and an opposite lower side that each extend from the first end of the base to the second end of the base, the support arm extending away from the upper side of the base, and the upper side of the tail portion of the base comprises a plurality of protrusions formed thereon.

14. The clip holder of claim 1 wherein the cantilever beam extends along a third axis, the bulb holder not disposed on the third axis.

15. The clip of claim 1 wherein the support arm outside of the common portion has an "H" shaped cross section perpendicular to the first axis, the cross section comprising a center wall extending along the first axis and a pair of support walls extending along opposite lateral sides of the center wall.

16. The clip of claim 15 wherein the support arm comprises an upper portion extending from the common portion to the cantilever beam, and the support walls of the upper portion extend beyond the cantilever beam.

17. The clip of claim 15 wherein the support arm comprises an upper portion extending from the bulb holder to the second end of the support arm and a lower portion extending from the bulb holder to the first end of the support arm;

the center wall of the upper portion of the support arm spacing apart the support walls of the upper portion of the support arm a first distance apart; and the center wall of the lower portion of the support arm spacing apart the support walls of the lower portion of the support arm a second distance apart greater than the first distance.

* * * * *